J. G. BROWN & G. T. BACON.
STEERING MECHANISM FOR ROAD ROLLERS.
APPLICATION FILED SEPT. 7, 1909.
963,509.
Patented July 5, 1910.
3 SHEETS—SHEET 2.
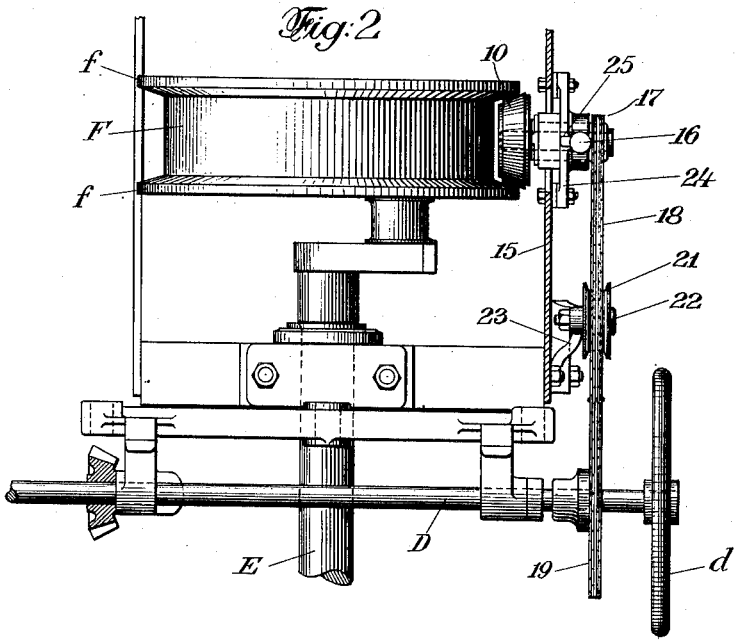
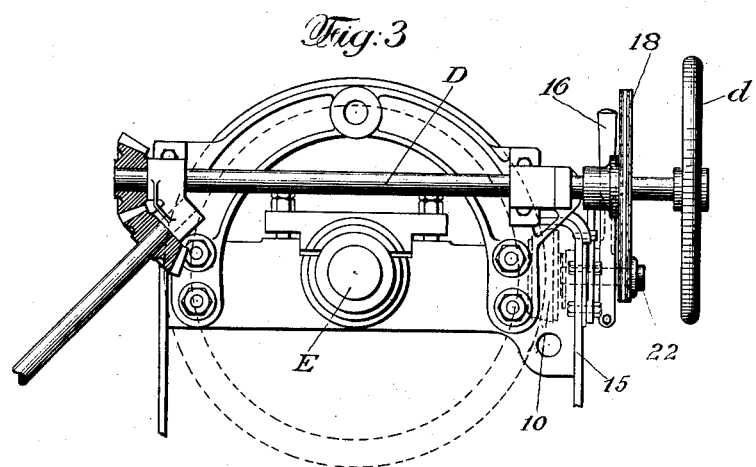
Witnesses:
Inventors:
J. Grove Brown and George T. Bacon,
By their Attorney
John F. Nolan

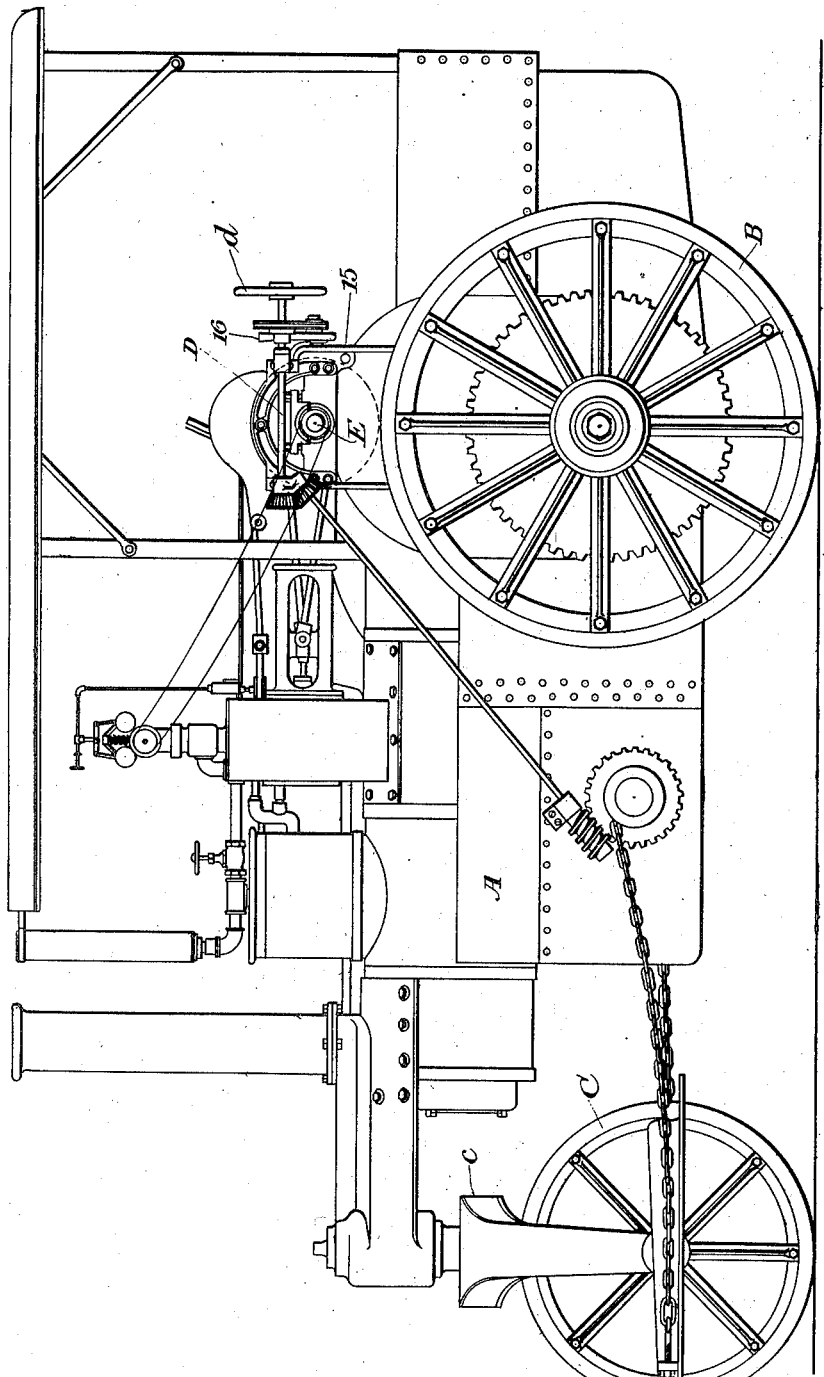

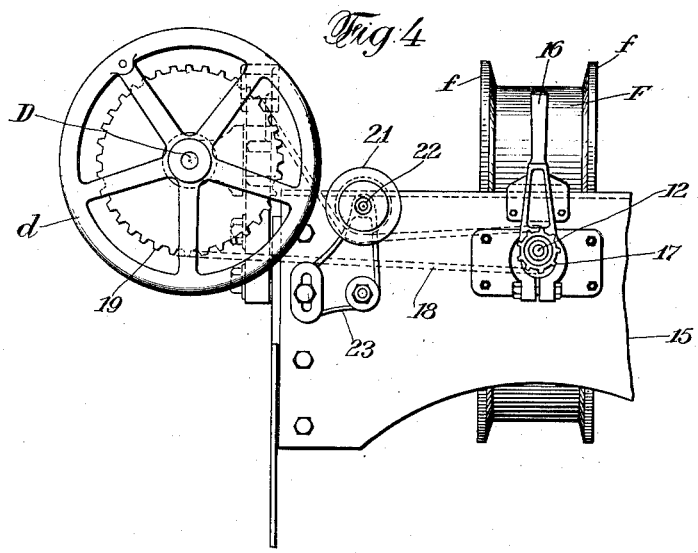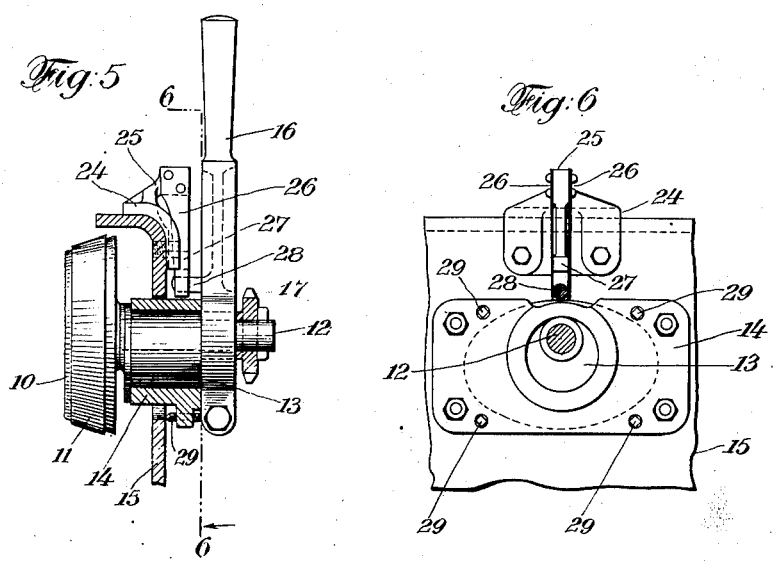

UNITED STATES PATENT OFFICE.

J GROVE BROWN AND GEORGE T. BACON, OF GROTON, NEW YORK, ASSIGNORS TO MONARCH ROAD ROLLER COMPANY, OF GROTON, NEW YORK, A CORPORATION OF NEW YORK.

STEERING MECHANISM FOR ROAD-ROLLERS.

963,509.  Specification of Letters Patent.  Patented July 5, 1910.

Application filed September 7, 1909. Serial No. 516,351.

*To all whom it may concern:*

Be it known that we, J Grove Brown and George T. Bacon, citizens of the United States, and residents of Groton, in the county of Tompkins and State of New York, have invented certain new and useful Improvements in Steering Mechanism for Road-Rollers, &c., of which the following is a specification.

This invention relates to power-operated steering gear for road rollers, traction engines, and analogous apparatus, and it has for its object to provide a mechanism of simple and efficient construction which can be readily thrown into or out of operative engagement with the constantly-rotating fly wheel of the engine in a manner to effect and control the steering of the apparatus, as conditions of service may require.

In the preferred form of embodiment of our invention herein illustrated, the usual hand-steering devices of the apparatus are conveniently equipped with our improved power steering mechanism, whereby not only is the tiresome and laborious operation of hand steering avoided, or its use rendered optional with the operator, but a more rapid and consequently a more effective operation is attained.

The invention, as generally stated, comprises power steering gear of the character mentioned embodying various novel features of construction and combinations of parts which will be hereinafter particularly described and claimed.

In the drawings—Figure 1 is a side elevation of part of a road roller, or traction engine, as equipped with steering gear embodying our invention. Fig. 2 is a sectional plan of part of the apparatus showing the engine wheel and the steering mechanism for coöperation therewith. Fig. 3 is a side elevation of the mechanism shown in Fig. 2. Fig. 4 is a front view thereof. Fig. 5 is a sectional elevation of the devices for supporting and shifting the friction wheel with respect to the engine wheel. Fig. 6 is a vertical section, as on the line 6—6 of Fig. 5.

A represents the body of a traction engine, or of a road roller; B the traction wheels, and C the forward steering wheel or roller.

The apparatus is herein illustrated as provided with the usual hand-steering devices, including the steering shaft D provided with the hand wheel *d*, said shaft being operatively connected through the usual gearing and chain connections with the pivoted frame *c* of the steering wheel or roller, whereby, by manipulation of the hand wheel, the said frame with its wheel or roller may be bodily moved on its vertical axis, within predetermined limits, to effect the requisite steering of the apparatus.

E is the engine crank shaft, and F the flywheel mounted thereon. This wheel, in pursuance of our invention, is provided with two spaced circumferential flanges *f*, having their inner surfaces oppositely beveled or inclined, as indicated. Between these beveled surfaces is interposed a correspondingly beveled friction wheel 10, having a peripheral covering 11 of leather, fiber, or the like, which wheel is so mounted and arranged that it may be bodily moved into operative peripheral engagement with either of the flanges or out of engagement from both. The friction wheel is carried by the inner end of a shaft 12 which extends outwardly and in a radial direction from the fly-wheel. This shaft is journaled eccentrically in an oscillatory sleeve or head 13 which is supported in a bearing member 14 bolted to a frame plate 15 in front of the fly-wheel in such a manner that the friction wheel lies centrally between and out of contact with the circumferential flanges of the fly-wheel. Clamped or otherwise secured to the forward end of the sleeve or head 13 (which end projects beyond the bearing) is an upwardly extending steering lever 16, by the manipulation of which the friction wheel may be moved into and out of engagement with the respective flanges, as hereinafter described. Fast on the outer end of the shaft 12 is a sprocket wheel 17 which is connected by means of a chain 18 with a larger sprocket wheel 19 on the hand wheel shaft, and between the two sprocket wheels is mounted an idler wheel 21 for the purpose of taking up wear or stretch of the chain. This wheel 21 is mounted on a stud 22 projecting from the bracket 23 which is adjustably secured to the frame plate 15, as indicated in Fig. 4.

By virtue of the eccentric mounting of the shaft of the friction wheel within the head 13, this wheel is bodily moved to the right or to the left when the hand lever is actuated by the operator as above indicated, thereby shifting the friction wheel into engagement with the opposing flange of the fly-wheel. The flange thereupon co-acts with and rotates the friction wheel, the motion being transmitted therefrom through the sprocket gearing to the steering shaft. When the friction wheel is engaged with one of the flanges, said wheel is turned in one direction, and when it is engaged with the other flange, the wheel is turned in a reverse direction, thus providing for rapid and efficient shifting of the steering wheel or roller in either direction desired.

Affixed to the frame plate, adjacent to and directly above the bearing member 14, is a bracket 24 at the upper extremity of which is a forwardly-projecting lug 25 to each side of which is fastened the upper end of a depending flat spring 26. The two springs lie in approximately a vertical position, their free lower extremities being maintained apart by a suitably disposed stop 27 projecting from the bracket. The springs depend below the stop and snugly embrace a rearwardly-projecting pin 28 on the steering lever, thereby yieldingly maintaining this lever normally in a vertical or neutral position, and yet permitting the lever to be laterally moved by the operator against the action of the opposing spring. By imparting to the springs a slight initial tension we are enabled to make them very light, and therefore capable of being easily operated.

In order to compensate for the reduction of the diameter of the friction wheel, incident to wear, we provide for the bodily adjustment of the bearing member 14, and its connections, toward and from the face of the fly wheel. In the absence of such provision under the condition mentioned, an excessive movement of the steering lever would or might be necessary to set the friction wheel in active position, and the resulting slackness of the driving chain would or might permit the chain to run off the sprockets. A simple and efficient means for permitting the requisite adjustment of the bearing member, comprises a series of suitably disposed set-screws 29 fitted to tapped holes in said member so as to bear against the frame plate and afford adjustable stops for the member when it is bolted in place. Instead of these set screws, a series of removable washers or liners of suitable thickness may be interposed between the bearing member and the frame plate, or any other suitable means for adjusting the friction wheel with respect to the beveled flanges of the fly-wheel may be employed.

It is to be noted that the hand wheel on the steering shaft is in front of the large sprocket wheel, and that this hand wheel may be manipulated at any time to steer the apparatus without the necessity of disconnecting any part of the power-steering devices. Moreover, that as the friction wheel runs idly in its bearings, no appreciable addition to the power is required to operate the hand wheel.

We claim—

1. In power-steering gear of the character mentioned, the combination with a shaft, and a wheel thereon provided with circumferential beveled flanges, of a beveled friction-wheel interposed between said flanges, a shaft for said friction-wheel, a head in which said shaft is mounted, a bearing for said head, means for adjusting said bearing axially of the friction-wheel, means for actuating said head to shift the friction wheel into and out of engagement with the respective flanges, steering devices, and connections between the same and the friction-wheel.

2. In power-steering gear of the character mentioned, the combination with a shaft, and a wheel thereon provided with spaced circumferential flanges, of a friction-wheel interposed between said flanges, a shaft for said friction wheel, a head in which said shaft is mounted, a bearing for said head, a hand lever connected with said head and provided with an outwardly-extending pin, yielding means engaging said pin to normally hold the friction-wheel in neutral position, steering devices, and connections between the same and the friction wheel.

3. In power-steering gear of the character mentioned, the combination with a shaft, and a wheel thereon provided with circumferential beveled flanges, of a beveled friction-wheel interposed between said flanges, a shaft for said friction-wheel, a head in which said shaft is mounted, a bearing for said head, means for adjusting said bearing axially of the friction-wheel, a hand lever connected with said head and provided with an outwardly-extending pin, yielding means engaging said pin to normally hold the friction-wheel in neutral position, steering devices, and connections between the same and the friction wheel.

4. In power-steering gear of the character mentioned, the combination with a shaft, and a wheel thereon provided with spaced circumferential flanges of a friction-wheel interposed between said flanges, a shaft for said friction-wheel, an oscillatory head in which the shaft is eccentrically mounted, a bearing for said head, a hand-lever connected with said head and provided with a stop, depending springs embracing said stop, steering devices, and connections between the same and the friction wheel.

5. In power-steering gear of the character mentioned, the combination with a shaft, and a wheel thereon provided with spaced circumferential flanges having oppositely-beveled inner surfaces, of a beveled friction-wheel interposed between said flanges, a shaft for said friction-wheel, an oscillatory head in which the shaft is eccentrically mounted, a bearing for said head, means for adjusting said bearing axially of the friction wheel, means for actuating said head to shift the friction-wheel into and out of engagement with the respective flanges, steering devices, and connections between the same and the friction-wheel.

Signed at Groton in the county of Tompkins and State of New York this thirty first day of August 1909.

J GROVE BROWN.
GEORGE T. BACON.

Witnesses:
M. C. SWARTWOUT,
LOUIS H. BRENNER.